Aug. 14, 1962  R. L. SHAPPELL  3,049,277
INSULATED CONTAINER
Filed Dec. 22, 1959
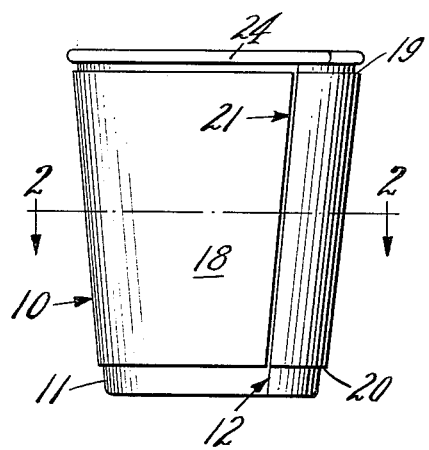
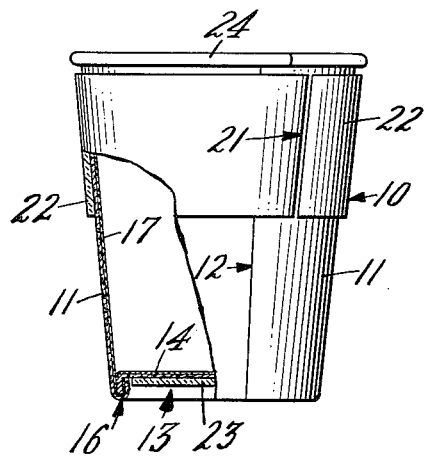
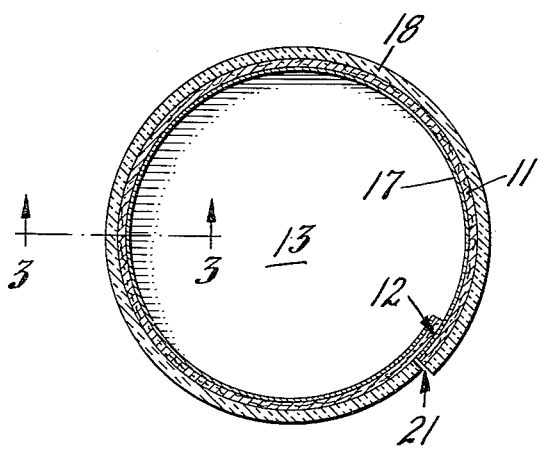
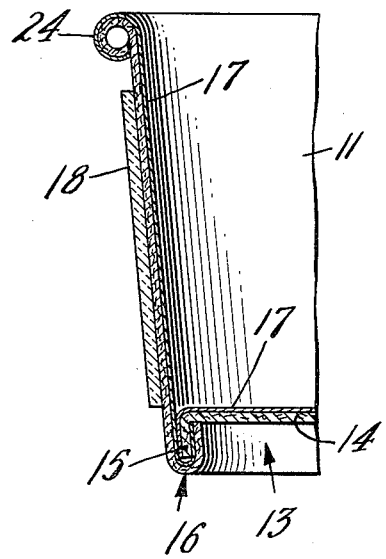
INVENTOR.
RICHARD L. SHAPPELL
BY Robert P. Auber
George W. Reiber
ATTORNEYS

United States Patent Office 3,049,277
Patented Aug. 14, 1962

3,049,277
INSULATED CONTAINER
Richard L. Shappell, Easton, Pa., assignor to American Can Company, New York, N.Y., a corporation of New Jersey
Filed Dec. 22, 1959, Ser. No. 861,269
5 Claims. (Cl. 229—1.5)

The present invention pertains to a disposable tapered nestable container and has particular reference to such a container having insulated exterior side surfaces.

The use of disposable tapered nestable containers to hold substances substantially above or below room temperature presents certain problems. Due to heat transferred through the container walls, the contents tend to approach room temperature more rapidly than is often desired, as for example in the warming of cold drinks, the melting of ice or ice cream, the degrading of foods requiring refrigeration, such as butter, cheese, etc. and the cooling of hot drinks or liquids such as coffee, tea, soups, etc. Furthermore, the heat transfer often makes manual holding of containers filled with very hot or very cold contents exceedingly uncomfortable or even physically painful in the case of very hot contents. Furthermore, the great increase in the use of automatic vending machines to dispense hot and cold foods in disposable tapered nestable containers has made the problem of manual handling of such contents in this type of container more acute.

In the past, proposed remedies for the above problems have been in the form of containers having multi-layered, air separated side walls, or foldable handles attached to the side wall of the container. The multi-layered container is undesirable because it is expensive to manufacture, and difficulty is experienced in nesting such containers for automatic machine vending. Providing the container with foldable handles is also unsatisfactory for a number of reasons. Most usually, the hot or cold contents are dispensed into the container with its handles folded. In this situation, it is still necessary to touch the side of the container to turn it to a position whereby the handle can be grasped and unfolded. Many vending machines are so designed that the container must be grasped near the bottom to lift it from the machine, thereby making use of the handles difficult until the container is removed from the dispensing station of the machine. Furthermore, a container having foldable handles is impractical for large sized containers, since handles made strong enough to hold the added weight necessitate making them uneconomically thick.

An object of the present invention is to provide a disposable container for hot and cold substances which will overcome the problems hereinbefore pointed out.

Another object is to provide such a container which will decrease the rate of heat transfer through the walls of the container to or from the contents of the container.

Another object is to provide such a container which can be comfortably held in the hand of the user regardless of the temperature of the contents of the container.

Another object is to provide such a container which can be grasped by the user from any position relative to the side wall of the container without discomfort to the user regardless of the temperature of the contents of the container.

Another object is to provide such a container which can be readily nested with like containers to simplify storage and packaging, and so as to be suitable for automatic vending machine dispensing.

A further object is to provide such a container which utilizes inexpensive materials and is simple to manufacture.

Numerous other objects and advantages of the invention will be apparent as it is better understood from the following description, which, taken in connection with the accompanying drawings, discloses a preferred embodiment thereof.

The elements of the present invention consist of an open-mouthed container having tapered sidewalls permitting the containers to be nested one within the other, a covering on the interior surface of the container which is impervious and resistant to hot or cold substances, and a layer of a particular insulating material secured to the exterior surface of the container whereby the container is held in the hand of the user.

Referring to the drawings:

FIGURE 1 is an elevational view of a container embodying the features of the present invention;

FIG. 2 is an enlarged sectional view taken substantially along line 2—2 of FIGURE 1;

FIG. 3 is a partial sectional view taken substantially along line 3—3 of FIGURE 2;

FIG. 4 is an elevational view of a modified form of the invention with portions broken away to show details of the structure.

For the purpose of describing a preferred or exemplary embodiment of the invention, the tapered nestable container will hereinafter be referred to as a paper cup in the shape of a truncated cone. However, it is to be understood that the subject of the invention is also applicable to other forms of tapered nested containers such as full cone cups, containers having rectangular or other polygonal cross-sectional configurations, and to materials other than paper.

As a preferred or exemplary embodiment of the instant invention, FIGS. 1, 2 and 3 show an insulated disposable cup generally designated 10 comprising a truncated conical body 11 formed of fibre sheet stock and having a side seam 12 which is preferably adhesively sealed. Disposed within the body 11 is a bottom 13 composed of a face portion 14 and a dependent skirt portion 15. The skirt portion 15 is enclosed and adhesively secured within an inwardly and upwardly extending curl on the lower end of the body 11 to form an adhesively sealed end seam 16. An outwardly rolled peripheral bead 24 is formed on the upper edge of the body 11 to stiffen the side wall and serve as a drinking lip.

The interior surface of the cup 10 is lined with a covering 17 which is inert and impermeable to both hot and cold comestibles. Examples of such interior coverings are thin metal liners such as metal foil or vapor deposited metal; cellulosic liners such as glassine, parchment, cellophane, etc.; resinous coatings applied either as a film, such as polyethylene, polypropylene, polystyrene, etc. or as a hardenable liquid, such as cured epoxy resin, vinyl solutions, etc. and flexible ceramic coatings. Because of their chemical resistance, low cost and ease of application, the preferred coatings are polymers of ethylenically unsaturated monomers such as polyethylene, polypropylene, polystyrene, etc.

The interior covering 17 may be applied as a lamination to the fibre sheet stock prior to the fabrication of the cup or may be applied to the interior surfaces after the cup 10 is fabricated. In the preferred embodiment of the invention, the interior covering 17 is a film of polyethylene laminated to the fibre sheet stock from which the body 11 and the bottom 13 are made. A polyethylene film thickness of one-half to three mils is suitable, with a preferred thickness of three-quarters to one mil. The polyethylene also acts as the adhesive for sealing the side seam 12 and end seam 16 by the application of heat and pressure. Alternatively, the covering 17 on the interior surface of the cup 10 may be a closed-cell, smooth surfaced foamed polystyrene material of the same type as that hereinafter described in connection with the insulating layer to be applied to the exterior of the cup.

Adhesively attached to the exterior of the cup body 11 is a layer of insulating material constituting an insulator 18. Preferably, though not necessarily, the insulator 18 covers substantially all of the side wall and extends from a point 19 adjacent the peripheral bead 24 to a point 20 adjacent the bottom edge of the cup. In the preferred embodiment of the invention, the insulator 18 is in the form of a closed-cell, smooth surfaced cellular plastic sheet, particularly foamed polystyrene. Among the reasons for preferring the closed-cell, foamed polystyrene over other insulating materials, including open-cell, sponge-like plastics, are its inexpensiveness, its resistance to permeation by moisture and other liquids, and its exterior smoothness, facilitating nesting and separation of a plurality of cups.

The insulator 18 can be assembled in any desired manner, either to the flat fibre sheet stock before it is blanked and formed into a cup or to the fully-formed cup. It is preferable, though not necessary, to keep the insulator 18 from entering and being enclosed within the body side seam 12 in order to minimize the thickness of the body seam 12. In the preferred embodiment shown in the drawing, the circumferential dimension of the insulator 18 is made shorter than the corresponding dimension of the body 11 by an amount substantially equal to the width of the side seam. In the assembled cup the fibre body material is overlapped an amount sufficient to form the body side seam 12, thereby bringing the marginal edges of the insulator into contiguous relation to form the insulator seam 21 as shown in FIG. 2. The relative positions of the body side seam 12 and the insulator side seam 21 need not necessarily be adjacent to each other as shown in the preferred embodiment. Depending upon the method used to assemble the finished cup, the insulator seam 21 may be located at any point on the circumference of the cup 10 relative to the body side seam 12.

The thickness of the insulator 18 can be varied in accordance with the intended use of the cup and the temperature expected to be encountered in the particular application. It has been determined that foamed polystyrene sheet having a thickness of 3 to 30 mils will effectively insulate the hand of the user from discomfort due to substances within the cup which are cold, i.e. down to 50° F., and which are hot, i.e. ranging in temperature from 130° F. to 212° F. and even higher. For most purposes, insulator thicknesses of from 5 to 15 mils will be adequate. Furthermore, the relatively thin gauge of the insulator 18 does not interfere with the nesting of the cups and does not hinder separation of the cups in the conventional cup dispensing systems as are presently used in automatic vending machines.

In the modified form of the invention as shown in FIG. 4, the cup is encircled by an insulating band 22 of substantially less width than the height of the cup 10. The width of the insulating band 22 and its location on the cup 10 may be varied so long as the user can conveniently grasp and hold the cup at the place provided. In general, the insulating band 22 should preferably be at least one inch in width and located on the upper portion of the cup 10. However, if a vending machine is of such a design that the cup must be grasped near the lower end to remove it from the dispensing station, the insulating band 22 would be positioned accordingly. Since a cup can be grasped and held at either the upper or lower ends, the narrower insulating band provides a suitable but less expensive construction.

It is apparent that the modified form of the invention shown in FIG. 4 will have a higher rate of transfer of heat to or from the contents of the cup than will the preferred embodiment, since only a portion of the side wall is covered by the insulating band 22 in the modified form. In certain applications, this will be permissible and justified by the lower costs. On the other hand, if it is desirable to further decrease the transfer of heat to and from the contents of the preferred or modified embodiment of the cup, a disc 23 of insulating material such as foamed polystyrene sheet may be attached to the exterior surface of the bottom 13 as shown in FIG. 4, the insulator thicknesses hereinbefore discussed being applicable. The disc 23 provides additional advantages in that it reduces the transfer of heat between the cup bottom 13 and the contiguous surfaces on which the cup 10 may be standing, and also reduces condensation due to the temperature differential between the contents of the cup and the surface on which the cup may be standing.

It can be readily seen that the cup described will be particularly advantageous for the handling of hot and cold substances as regards the comfort of the user. An additional advantage of the preferred embodiment of the invention using the insulator 18 of substantially the full height of the cup 10 is that the hot substance within the cup is insulated to a greater degree from the cooling effects of the ambient temperature to which the filled cup is subjected and will therefore retain its high temperature for a longer period of time. Conversely, such a cup is also desirable for use with cold substances, such as ice cream or cold drinks, since the insulator 18 would decrease the heat transmitted from the ambient air to the cold substance within the cup and thus delay the undesirable melting or warming of the substance for a longer period of time.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:
1. A disposable tapered nestable container comprising a fibre side wall, a coating on the inside surfaces of said side wall consisting essentially of a polymer of an ethylenically unsaturated monomer, and a circumferential band of a cellular plastic insulating material adhesively attached to the outer surface of said side wall, said band being substantially narrower in width than the height of said side wall but covering at least an area sufficient to permit the container to be grasped thereon between the thumb and forefinger of the user whereby the heat transfer between the contents of the container and the surfaces of the hand of the user in grasping contact with said side wall is minimized.

2. The container set forth in claim 1 wherein said cellular plastic is foamed polystyrene.

3. The container set forth in claim 1 wherein said cellular plastic is smooth-surfaced foamed polystyrene plastic sheet having a thickness of between 3 and 30 mils.

4. The container set forth in claim 1 wherein said side wall is a truncated cone and having a fibre bottom adhesively secured to the bottom thereof.

5. The container set forth in claim 1 having an outwardly rolled bead at the top of said side wall.

References Cited in the file of this patent

UNITED STATES PATENTS

| | | |
|---|---|---|
| 2,820,585 | Nerenberg et al. | Jan. 21, 1958 |
| 2,853,222 | Gallagher | Sept. 23, 1958 |
| 2,856,113 | Brumby et al. | Oct. 14, 1958 |
| 2,905,350 | Edwards | Sept. 29, 1959 |
| 2,917,215 | Psaty et al. | Dec. 15, 1959 |
| 2,917,217 | Sisson | Dec. 15, 1959 |
| 2,969,901 | Behrens | Jan. 31, 1961 |